United States Patent [19]
Allard

[11] 4,382,803
[45] May 10, 1983

[54] TOOLS FOR OPTICAL LENSES

[75] Inventor: Frederic P. Allard, Warwick, R.I.

[73] Assignee: Rowland, Incorporated, Berlin, Conn.

[21] Appl. No.: 174,269

[22] Filed: Jul. 31, 1980

[51] Int. Cl.³ .............................................. C09K 3/14
[52] U.S. Cl. ..................................................... 51/298
[58] Field of Search ............... 264/311; 51/298, 284 E

[56] References Cited

U.S. PATENT DOCUMENTS

| | | | |
|---|---|---|---|
| 2,426,215 | 8/1947 | Hicks | 51/298 |
| 2,860,961 | 11/1958 | Gregor et al. | 51/298 |
| 3,407,169 | 10/1968 | Johnson et al. | 260/38 |
| 3,420,794 | 1/1969 | May et al. | 528/93 |
| 3,551,551 | 12/1970 | Hugi | 264/311 |
| 3,598,693 | 8/1971 | Andersen et al. | 428/221 |
| 3,677,879 | 7/1972 | D'Andrea | 260/37 N |
| 3,713,796 | 1/1973 | Valerio et al. | 51/298 |
| 3,746,662 | 7/1973 | Adelman | 260/37 EP |
| 3,755,213 | 8/1973 | Kendall et al. | 521/178 |
| 3,763,080 | 10/1973 | Deuter | 260/37 EP |
| 3,817,906 | 6/1974 | Tsukioka et al. | 260/37 EP |
| 3,839,076 | 10/1974 | Miller | 427/35 |
| 3,849,366 | 11/1974 | Patrick | 260/37 EP |
| 3,864,101 | 2/1975 | Charvat | 51/298 |
| 3,868,233 | 2/1975 | Carver | 51/298 |
| 3,888,575 | 6/1975 | Fujii et al. | 252/513 |
| 3,910,852 | 10/1975 | Lederman et al. | 252/512 |
| 3,910,857 | 10/1975 | Phillips | 260/38 |
| 3,954,650 | 5/1976 | Bliss | 252/182 |
| 3,983,075 | 9/1976 | Marshall et al. | 252/511 |
| 3,996,175 | 12/1976 | Schreiber et al. | 260/28 P |
| 3,998,779 | 12/1976 | Baer | 260/37 EP |
| 4,002,418 | 1/1977 | Wallace | 264/311 |
| 4,035,160 | 7/1977 | Taguchi | 51/298 |
| 4,055,533 | 10/1977 | Malone | 260/37 EP |
| 4,086,197 | 4/1978 | Bouche et al. | 260/18 PN |
| 4,106,915 | 8/1978 | Kagawa | 51/298 |

FOREIGN PATENT DOCUMENTS

| | | | |
|---|---|---|---|
| 1296786 | 6/1969 | Fed. Rep. of Germany | 264/311 |
| 49-44939 | 11/1974 | Japan | 264/311 |
| 1169121 | 10/1969 | United Kingdom | 264/311 |

OTHER PUBLICATIONS

Translation of German Auslegeschrift (DAS) No. 1,117,298, Published 11/61.

*Primary Examiner*—James H. Derrington

[57] ABSTRACT

A method is provided whereby articles of manufacture, such as tools suitable for use in lens grinding and finishing operations, can be cast with an aluminum filled epoxy composition. The resultant articles are relatively inexpensive and light in weight, and they exhibit the levels of dimensional stability, durability, hardness, and machineability necessary to render them highly suited for their intended purposes.

27 Claims, 2 Drawing Figures

TOOLS FOR OPTICAL LENSES

BACKGROUND OF THE INVENTION

In the production of optical lenses, grinding and polishing operations are generally carried out utilizing tools known as "blocks" and "laps". The block is the tool in which the lens blank is secured, normally with a low melting alloy, and the lap (rectangular or round) is the tool upon which the surfacing operation is performed. In both instances, the tools must be very hard, wear resistant and durable, and they must have a high degree of dimensional stability and machineability. Thus, it is essential in producing precision lenses that the surfaces used for mounting of the tool, and for engagement of the lens blank, accurately correlate to one another, to the lens blank, and to the machine or device in which the tool is mounted. The tool must not be subject to undue damage in normal use, nor to undue wear from the abrasives with which certain of the surfacing operations are carried out, and it must be capable of withstanding secure clamping or support by other means in the mechanism involved, without damage or distortion. Normally, the blocks and laps are produced with standard curvatures, and are then subsequently machined to precise specifications; consequently, it is imperative that the tool be readily adapted to such operations. Finally, if the heat generated during the surfacing operations is not dissapated, it can ultimately cause surface warpage, and this is particularly true in the instance of plastic lenses; although flooding with an aqueous coolant effectively dissipates a large amount of the heat, still the thermal conductivity of the tools (and especially the lens block) is an important consideration.

Typically, lens finishing laps and blocks have been produced from metals; iron and aluminum are employed most prevalently, but bronze and brass are also utilized to some extent. The metal tools are, however, relatively expensive and heavy. The cost of such a tool has demanded careful handling and maintenance; moreover, relatively complex constructions, such as the utilization of hard metal inserts in a sintered metal block, have been employed to minimize costs. Weight, of course, is disadvantageous not only from the standpoint of handling and transportation, but perhaps more significantly from the standpoint of producing inordinate levels of wear in the associated equipment. For example, a typical orbital surfacing machine utilizes a so-called "wobble bearing" in the lap supporting mechanism. The weight of the lap obviously has a profound effect upon the load to which the wobble bearing is subjected, and the use of conventional metal laps often causes such wear as to require frequent replacement of the bearing.

In an effort to avoid the cost of other disadvantages of utilizing metal tooling, attempts have been made to substitute parts fabricated from synthetic resinous materials. Typical of such an attempt is the approach described in U.S. Pat. No. 2,426,215, to Hicks, wherein a thermoplastic synthetic resin molding compound is described for use in producing an abrading lap for cold working of optical materials. The resins disclosed include polystyrene, methylmethacrylate polymer, polyvinyl acetate and polyvanylidene chloride resins. As a practical matter, such laps are found to be deficient and not commercially feasible, due largely to the poor machineability that is afforded by the resins proposed; thermoplastic tools of this sort may also be unduly susceptible to the effects of thermal energy generated during the surfacing operations.

Accordingly, it is an object of the present invention to provide a novel, monolithic tool for use in surfacing of optical lenses, which is relatively inexpensive and relatively light in weight.

It is a more specific object of the invention to provide such a tool which is produced from an epoxy resin, and which is uniformly hard, durable, dimensionally stable, and machineable, and which may exhibit enhanced thermal and electrical conductivity.

It is also an object of the invention to provide a novel method for producing such a tool having uniform properties, from an epoxy casting compound, which method may be carried out quickly and conveniently, and at relatively low cost.

A more specific object of the invention is to provide such a novel method wherein silicone molds may be employed in a centrifugal casting technique, and wherein the casting compound is formulated to afford facile and efficient casting and rapid curing, to cause a minimum level of attack upon the silicone mold members, and to shrink to a minimum extent during the molding operation, and to produce a tool that accurately reproduces the dimensions and configuration of the mold cavity.

SUMMARY OF THE INVENTION

It has now been found that certain of the foregoing and related objects of the present invention are readily attained in a method for the production of an article from a highly filled epoxy casting compound, which comprises the following steps: A resin component is first prepared which includes a reactive epoxy resin, a filler consisting of finely divided aluminum, a finely divided inert material, or a mixture thereof, and preferably a suspension agent. A hardener component is also prepared including at least one hardener reactive with the epoxy resin to produce crosslinking, and a filler as previously defined. The resin component and the hardener component are admixed in a ratio selected to provide, in the resulting admixture, a suitable amount of hardener to effect substantially complete reaction with the epoxy resin and a high degree of crosslinking. The ratio of admixing also provides about 5 to 15 percent of aluminum and about 50 to 65 percent of the mineral filler, based upon the weight of the admixture. Thereafter, the admixture is introduced into the casting system of a centrifugal casting machine having at least one casting cavity defined by a member, which is preferably fabricated from a rubbery silicone rubber having a Shore A Durometer value of 50 to 65. The machine is operated to effect centrifugal casting of the admixture into the casting cavity, and the admixture is maintained at an appropriate temperature for a period of time sufficient to effect substantial crosslinking between the resin and the hardener, so as to thereby produce an article. Finally, the article is removed from the casting cavity.

In preferred embodiments of the invention, the casting machine will have a plurality of casting cavities, and the mixture will be introduced thereinto while the machine is in operation. Best results will normally be achieved when the casting cavity defining member is at a temperature of about 70° to 120° Centigrade when the admixture is cast thereinto, and when the period of time during which the admixture is maintained at the appropriate temperature is at least about 1 to 3 minutes;

generally, the mold will be preheated to achieve that temperature initially and to provide the thermal energy necessary to effect the requisite crosslinking, although added thermal energy may not be required for ongoing operation due to the exothermic nature of the curing reaction.

In most instances, the epoxy resin used in the method will be a product of reaction between bisphenol A and epichlorohydrin. The hardener will desirably comprise a mixture of at least one aliphatic polyalkylene polyamine, and at least one fatty acid amide; the preferred polyamines are triethylene tetramine and tetraethylene pentamine, and the preferred amide is a soy oil derivative. Most desirably, both of the aliphatic polyalkylene polyamines will be used, and the hardener component may additionally include a diluent reactive with the epoxy resin to produce crosslinking; typically, nonylphenol will be employed as such a diluent. The finely divided aluminum employed in the casting compound is desirably atomized or colloidal, and preferably has a particle size and distribution permitting passage of at least about 80 percent of its particles through a standard 325 mesh screen. The preferred inert mineral filler is calcium carbonate, and pyrogenic, or fumed, silica functions as a highly effective suspension agent. Generally the latter will be used in a concentration of about 0.1 to 0.5 percent, based upon the weight of the resin component (i.e., the mixture of epoxy resin and fillers herein described) utilized in the casting compound, and it will most conveniently be incorporated into the component with a suitable vehicle, such as may be provided by glycerin. The resin and hardener components will generally be admixed in a ratio of their respective weights of about 1.5 to 3:1, and preferably that ratio will be about 2:1.

Certain additional objects of the invention are attained by the provision of a tool for use in surfacing of optical lenses, which tool comprises a monolithic body cast from a highly filled epoxy casting compound. The body has a generally spherical surface portion adapted to engage an optical lens member, and it has a mounting portion spaced from the spherical surface portion, which mounting portion has means thereon corresponding to features of the surface portion and adapted to permit accurate registration of the surface portion elements with respect to the device in which the tool is to be mounted. The epoxy casting compound employed to produce the body of the tool comprises an epoxy matrix and a filler. The filler comprises about 55 to 70 weight percent of the compound and is uniformly distributed throughout the matrix. The tool is hard, durable and dimensionally stable, and is adapted for machining to modify the dimensions and configuration of the portions thereof.

In preferred embodiments of the tool, the filler comprises a mixture of aluminum and an inert mineral, with the aluminum providing about 5 to 15, and preferably 6 to 7, weight percent of the compound and the mineral providing about 50 to 65 weight percent thereof (the proportions will be balanced to provide the desired total amount of filler ingredients). The matrix is desirably produced by the reaction of a reactive polyepoxide resin and a hardener system which includes at least one amine hardener, the resin comprising about 20 to 30 weight percent of the casting compound and the hardener comprising about 5 to 15 weight percent thereof. Most desirably, the casting compound utilized to produce the tool additionally includes a small amount of a suspension agent, such agent being believed to be effective to maintain uniform dispersion of the fillers employed throughout the epoxy matrix during dynamic casting. Ideally, the tool will have a hardness value of at least about 70, as determined by a Barcol impresser, utilizing ASTM Test Method D 2583; generally that value will not exceed about 93.

Certain objects of the invention are achieved wherein the tool is a lap having a spherical surface portion of convex configuration, with the registration features including the axis or axes of curvature thereof. Other specific objects of the invention are achieved by the inclusion of a small amount of graphite fiber in the epoxy casting compound, which fiber produces enhanced thermal and electrical conductivity to the resultant tool. Finally, objects of the invention are afforded by the provision of a tool for use in surfacing of optical lenses, produced in accordance with the method hereinabove set forth.

DETAILED DESCRIPTION OF THE ILLUSTRATED EMBODIMENT

Figure 1:
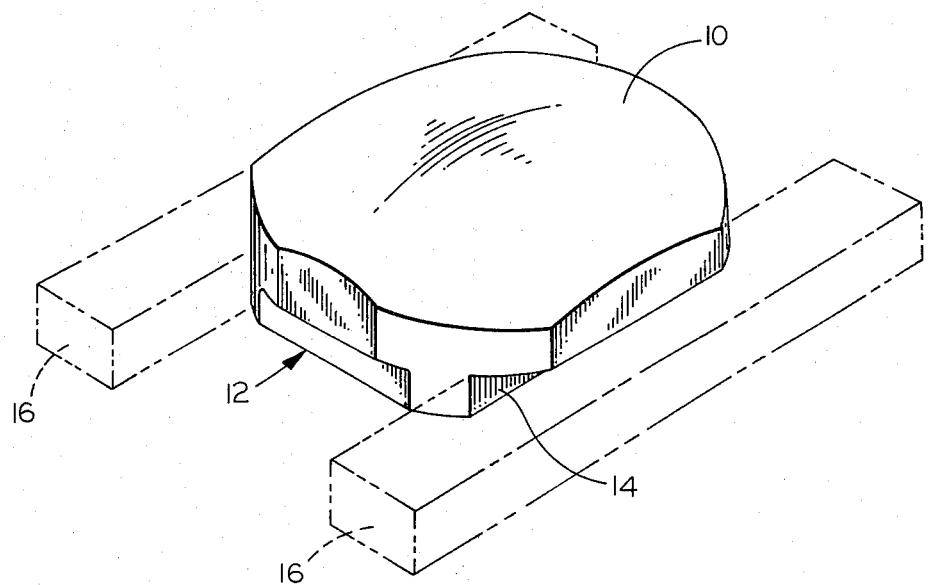
FIG. 1 is a perspective view of a rectangular surfacing lap embodying the present invention, mounted between the jaws of a surfacing machine, which are shown in phantom line.
Figure 2:
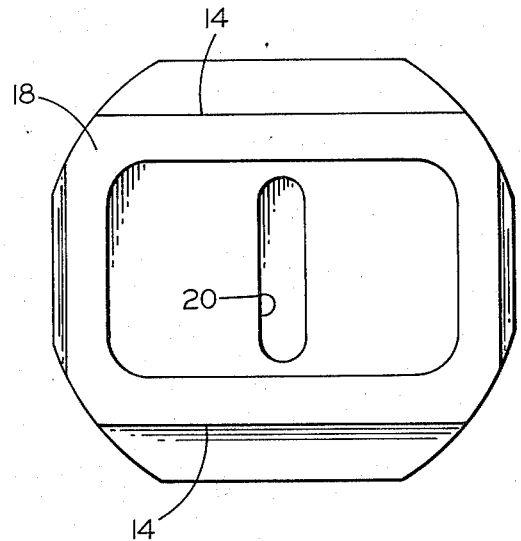
FIG. 2 is a bottom view of the lap of FIG. 1.

Turning now in detail to the Drawing, therein illustrated is a monolithic rectangular lap having a generally spherical upper surface or crown 10 and a rectangular mounting portion, generally designated by the numeral 12, spaced from the spherical surface 10 and disposed at the base of the tool. The mounting portion 12 consists essentially of a first pair of elongated, strictly parallel and rectilinear short vertical walls 14, which are adapted to receive therein the jaws 16 of the clamping portion of a surfacing machine (not illustrated). Formed into the bottom wall 18 of the lap is an oval recess 20, which is dimensioned and configured to receive therein an upstanding post or similar element of the surfacing machine. As will be understood, the walls 14 are accurately spaced and parallel to the center line of the lap so as to ensure that the lap may be precisely registered laterally with the functional axis of the surfacing machine. Similarly, the axis of the recess 20 is precisely located with respect to the center of the lap and perpendicular to the walls 14, so that the mounting post of the machine inserted therein will produce accurate alignment in the longitudinal sense. Accordingly, the walls 14 and recess 20 cooperate to readily permit precise positioning of the lap in the machine, as is conventional in such tooling.

It will also be appreciated that the spherical surface 10 constitutes the working surface of the tool, which in operation contacts the surface of the lens blank to be gound or polished. As is well known in the art, the surface 10 will carry a grinding slurry, an abrasive sandpaper, a lapping film, a velveteen polishing pad, or other conventional finishing elements. Its curvature is accurately machined to the desired diopter value, so as to produce the specified optical properties in the lens, and the elements of the mounting portion correspond closely thereto, so as to ensure that the surface 10 bears the necessary relationship to the axes of movement of the surfacing machine.

DETAILED DESCRIPTION OF THE PREFERRED EMBODIMENTS

In a broad sense, the epoxy casting composition utilized in the practice of the present invention will contain about 20 to 30 weight percent of the reactive polyepoxide or epoxy resin, about 5 to 15 weight percent of the hardeners, and about 55 to 70 percent of the fillers. As is conventional in the utilization of epoxy formulations, the ingredients which ultimately produce the cured resin will generally be prepared as two separate "components" (i.e., the resin component and the hardener component), which are admixed prior to utilization. To ensure thorough mixing without undue viscosity or lumpiness in either of the components, the fillers will generally be apportioned therebetween. The hardener component and the resin component will be admixed in proportion to the number of reactive epoxy groups present in the resin, and the stoichiometry of the system will generally dictate utilization of the resin component in a weight ratio to the hardener component ranging from about 1.5 to 3:1 thereto. In most instances, a weight ratio of approximately 2:1 will produce the best results, but this will, of course, depend upon the nature of the epoxy resin and the hardener system employed, as well as, to an extent, the properties desired in the ultimate product and other ingredients included therein.

The manner of formulation for the casting compounds of the present invention is quite straightforward, and will generally entail blending of the various components, usually at a somewhat elevated temperature (i.e., typically about 55° to 65° Centigrade), utilizing a suitable apparatus, such as a Cowles mixer. The components of the compound may be degassed following thorough mixing (the necessity for which will depend largely upon the amount of moisture in the mineral filler), and maintained under slow agitation to avoid settling, until such time as they are admixed to produce the casting composition.

The epoxy resin will generally comprise about 25 to 45 weight percent of the resin component, with a typical concentration being about 35 weight percent. Virtually any reactive polyepoxide that is liquid at room temperature may be employed in the practice of the present invention, as long as it affords the physical characteristics which are necessary in the final product, and is capable of curing (with suitable hardeners) at a sufficiently fast rate to permit practical utilization of the instant method. As will be evident to those skilled in the art, the commercially available bisphenol A-epichlorylhydrin polyepoxides are most satisfactory for use in the present invention. Such resins may be obtained under the trade designation D.E.R. (e.g., Nos. 331 and 332) from the Dow Chemical Company, under the EPON designation (e.g., No. 828) from Shell Chemical Company, and under the designation ARALDITE (e.g., No. 521), from Ciba-Giegy Corporation. Although somewhat less desirable, the epoxy-novolac resins may also be employed in the practice of the present invention. The foregoing description of suitable resins is, of course, merely illustrative, and numerous substitutions of appropriate resins will be evident to those skilled in the art.

The resin component will also include approximately 2 to 4 weight percent, based upon the total weight of that component, of a finely divided aluminum filler, which is most desirably atomized aluminum metal in a colloidal state. Such a product may be purchased as Alcoa Aluminum No. 101, which is a material in which at least 80 percent of the particles will pass through a 325 mesh screen. Although aluminum of finer particle size may be employed, it is not necessary to do so; on the other hand, an aluminum powder containing particles which are excessively large will be unsatisfactory, in tending to settle out during the centrifugal casting operation.

The third ingredient of the resin component is an inert mineral in a finely divided condition, which is added for the purpose of reducing the cost of the product as well as to provide (together with the aluminum) necessary physical characteristics thereto, particularly dimensional stability and machineability. Especially suitable for use in this application is calcium carbonate, such as the product commercially from Pfizer Chemical Company under the designation "325". This material is of sufficiently fine particle size and particle size distribution as to permit substantially all of it to pass through a 300 mesh screen. Generally, the inert filler will be included in the resin component of the composition in an amount of approximately 60 percent, although percentages in the range of about 50 to 65 percent may be employed, depending largely upon the degree to which the liquid ingredients of the resin component are absorbed thereby; obviously, the lower the level of absorption of the filler, the less of that ingredient that can be incorporated. Although mineral fillers other than calcium carbonate may be employed in the practice of the invention, and, for example, talc has been employed (albeit with excessive viscosity resulting), most desirable results will generally be achieved when calcium carbonate is utilized.

An especially desirable ingredient for inclusion in the resin component of the casting compound is a suspension agent, which is believed to function to maintain the finely divided fillers in uniform distribution throughout the admixture, even during the centrifugal casting operations. Obviously, were the concentrations of fillers to vary, non-uniform characteristics would be imparted to the ultimate product, which would be intolerable in optical surfacing tools of the type herein involved. The preferred suspension agent is a pyrogenic, or fumed, silica, such as is available under the trade designation CAB-O-SIL from the Cabot Corporation. Other materials, such as bentonite, cellulosic gums, and the like, may be substituted for the fumed silica, but with considerably less satisfactory results. In general, only small amounts of the suspension agent will be employed, a typical concentration being about 0.1 percent, based upon the weight of the total resin component. Generally, the suspension agent will most conveniently be introduced into the formulation in a carrier with which it may be premixed, a suitable carrier being glycerin.

In some instances, it may be desirable to include other ingredients in the resin component of the casting compound, and this may be done either to improve existing properties or to introduce new properties into the resin. For example, especially when the casting compound is to be employed for the production of a lens block, it may be desirable to include, as an additional filler, a small amount of milled graphite fiber to enhance heat transmission and electrical conductivity; the loading level will generally be in the neighborhood of about 2 percent, based upon the weight of the resin component. When the tool is to be used in an application in which relative movement occurs between it and its supporting means (e.g., again in the instance of a lens block), it may also be desirable to incorporate an effective amount (e.g., about 0.1 percent) of a solid lubricant, such as the fluorocarbon talomers available from E. I. DuPont de Nemours & Co. under the designation VYDAX.

The selection of the hardeners, or curatives, utilized for the cross-linking of the resin ingredient of the resin component is especially important, so as to ensure not only that relatively brief cure periods are afforded, but also to achieve the optimum levels of physical properties necessary in the cured product, which are frequently inconsistent objectives. Thus, whereas a wide variety of available hardeners may be employed, in preferred embodiments of the invention certain ingredients will be utilized in view of the optimal balance that they provide between cure time and physical properties.

Among the effective curing agents that may be employed in the practice of the present invention are the fatty acid amides, such as the soy amides commercially available from Henkel Chemical Company under the trade designation VERSAMIDE; the product bearing the grade designation 150 is especially desirable, but the 140 product may also be utilized with good results under certain circumstances, albeit that high viscosities may result. While the VERSAMIDE products are very effective in producing desirable physical properties in the cured resin, their reaction rates at room temperature are generally too slow to permit their use as the sole curative. Other somewhat more reactive amide compounds may be utilized, with a suitable product being that which is available from Agimoto Chemical Company under the designation AJICURE AB002. This product is also a soy amide, and may be especially desirable in those instances in which it is important to maintain a controlled exotherm during curing.

The aliphatic polyalkylene polyamine hardeners are advantageously utilized in the hardener system, and usually a combination thereof with a fatty acid amide will afford the best balance of properties. Thus, the amides tend to provide highly desirable physical properties to the cured resin, and the polyamines tend to produce high rates of cure at room temperature, or temperatures elevated somewhat thereabove, while contributing further to the desirable physical properties. Typical of the polyamines that can be used in the practice of the present invention are triethylenetetramine (TETA) and tetraethylenepentamine (TEPA), which are most desirably utilized hereintogether and in combination with an amide. It may be noted that, although other polyalkylene polyamines may also be employed, in some instances they are found to promote excessive attack upon the silicone rubber molds that are preferred in the casting operation, or to adversely affect cure rates. Another compound that may beneficially be employed as a hardener is isophoronediamine, which affords an especially high degree of dimensional stability to the ultimate product. The so-called reactive diluents, which are capable of reaction with the epoxide groups of the epoxy resin to produce crosslinking, may also constitute part of the hardener system and, while other suitable compounds will be evident to those skilled in the art, nonylphenol produces outstanding results.

A typical hardener component will contain about 15 to 25 weight percent of a fatty acid amide, about 5 to 15 weight percent of TETA, about 5 to 15 weight percent of TEPA, and about 1 to 5 percent of nonylphenol. The mixture of hardeners and their proportions may, however, vary widely, and the specific formulation will depend upon many factors, including the conditions of heat and humidity under which the resin is to be cured. In this regard, it might be noted that the foregoing specific ranges provide a system that is especially appropriate under conditions of relatively low ambient temperature and humidity. To accommodate higher temperature and humidity levels, the concentrations of both amines may be reduced to one percent, substituting therefor two percent of AJICURE AB002 and an additional six percent of calcium carbonate filler; in such an instance, a 3:1 ratio of the resin component to the hardener component is suitable.

The hardener component will also include approximately 5 to 10 weight percent of atomized aluminum (i.e., the same product utilized in the resin component), and about 50 to 65 weight percent of the inert mineral filler (i.e., the pulverized calcium carbonate hereinabove specified).

In terms of the total casting compound, a typical formulation includes about 23 to 25 weight percent of the polyepoxide resin, about 6 to 7 weight percent of aluminum powder, about 60 weight percent of calcium carbonate, about 7 weight percent of soy amide hardener, about 3 to 4 weight percent of the combination of TETA and TEPA, about 1 weight percent of nonylphenol, about 0.25 to 0.3 weight percent of glycerin, and about 0.05 to 0.1 weight percent of fumed silica; such a formulation is especially well suited for the production of a lapping tool. Another typical formulation, which produces a compound especially well suited as a blocking tool, consists of about 23 to 25 weight percent of the polyepoxide resin, about 10 to 11 weight percent of aluminum powder, about 54 to 55 percent of calcium carbonate, about 5 weight percent of isophorone diamine, about 5 weight percent of a mixture of TETA, TEPA and soy amide, about 1.5 weight percent of graphite fiber, about 0.1 weight percent of a solid lubricant, and the suspension agent in its carrier in the amounts previously specified.

As hereinabove indicated, the present invention entails the centrifugal casting of such filled epoxide casting compounds to produce articles of manufacture, and especially tools for use in surfacing of optical lenses. Essentially, the centrifugal casting operations entail heating of the casting composition to an appropriate temperature, and introducing it into a centrifugal casting machine, wherein the mold cavities (of which there will generally be a multiplicity) are preheated (if necessary) to an appropriate temperature to enable the achievement of relatively rapid cure rates. Setting time depends, to an extent, upon the temperature of the casting compound; for example, a compound introduced at about 60° Centigrade will require about 6 minutes to set up well, whereas a compound at about 75° Centigrade may be fully set after only one minute. Typically, the actual curing temperatures will be in the range of about 100° to 120° Centigrade, and the curing times will be about 1 to 3 minutes in duration (exclusive of the time necessary for stripping from the mold). The speed of rotation of the casting machine will vary depending upon factors such as the nature of the casting compound, the dimensions of the mold cavities and their relative positions in the casting machine, and similar considerations. Generally speeds of about 300 to 500, and more usually 350 to 450, revolutions per minute will be utilized, and centrifugal forces on the order of magnitude of 30 times the acceleration due to gravity may typically be developed.

It should be noted that fumed silica is known in the art as a thixotropic agent, and has previously been employed in filled epoxy formulations (see, for example, U.S. Pat. Nos. 3,763,080 and 3,910,857 to Deuter and Phillips, respectively). However, as far as is known, such formulations have not heretofore been used for centrifugal casting, and it would be surprising that, under such conditions, the homogeniety of the system can be maintained. Thus, since a thixotrope by definition causes viscosity to decrease under increasing shear stresses, one would expect such an agent to promote nonuniformity of filler dispersion, rather than to maintain homogeniety, when subjected to the forces generated during centrifugal casting conditions.

Most desirably, casting is carried out utilizing mold members produced from a silicone rubber formulation, since doing so permits the attainment of articles that are of precise dimensions and configuration, and greatly facilitates stripping of the articles from the mold when the curing operations have been completed. Generally, it is desirable to utilize a cured silicone rubber that exhibits a Shore A Durometer value of 40 to 70, with values of 50 to 65,. and especially 58 or higher, being preferred. A typical formulation for producing such a rubber may employ a single rubber or a rubber blend, to which may be added a filler and an appropriate latent catalyst. The ingredients may be compounded on a two roll mill to produce sheets of raw rubber, which may then be employed in the production of the desired mold members. Such production entails forming of the uncured silicone rubber about the models that are to be reproduced by the mold, and heating of the rubber to an appropriate temperature, under pressure and in an appropriate molding device, to effect the curing reaction. The molds are conveniently produced in two sections, which may be separated to enable facile removal of the models used to produce the cavities, and to enable creation of the sprues and gates necessary to connect the mold cavities to a central filling opening, which is formed therein.

In use, the two halves of the mold may be clamped between members mounted for rotation in a standard centrifugal casting machine. One of the mold sections may comprise a top portion, with which the lower section may be brought into closed, aligned relationship using a pneumatically operated pressure table of the machine. The force holding the two halves together will be of such an order of magnitude as will prevent leakage without causing distortion of the mold. Upon achievement of the necessary mated relationship between the two mold sections, the machine may be actuated to produce rotation, after which the casting compound is introduced to effect casting.

Illustrative of the efficacy of the present invention are the following specific examples:

EXAMPLE ONE

A grinding and polishing lap is produced by first preparing a casting compound from the following ingredients:

| Resin Component | Weight Percent |
|---|---|
| polyepoxide (Dow D.E.R. 331) | 35.5 |
| atomized aluminum (Alcoa 101) | 4.0 |
| calcium carbonate (Pfizer 325) | 60.0 |
| fumed silica (Cabot CAB-O-SIL M5) | 0.1 |
| glycerine (Proctor and Gamble) | 0.4 |
| | 100.0 |

| Hardener Component | |
|---|---|
| polyamide curative (Henkel VERSAMIDE 150) | 20.0 |
| TETA | 5.0 |
| TEPA | 5.0 |
| nonylphenol (o,m,p mixture) | 2.5 |
| atomized aluminum (Alcoa 101) | 10.0 |
| calcium carbonate (Pfizer 325) | 57.5 |
| | 100.0 |

The resin compound is formulated with the polyepoxide initially at ambient temperature, with the atomized aluminum and then the calcium carbonate fillers being added thereto. Thereafter, the fumed silica in the glycerine carrier is introduced, with appropriate mixing occurring at each stage of addition. Specifically, the formulation is mixed in a Cowles mixture, with blending proceeding for a period of approximately 25 minutes to mix the three initial components, and for an additional five-minute period following introduction of the silica suspension agent. This blend is degassed if necessary (i.e., depending upon whether or not the calcium carbonate filler contains a sufficient amount of water to require such a step), and is maintained at a temperature of approximately 60° (which it attains during mixing) under slow agitation to ensure that the solids are maintained in a homogeneous state of dispersion. Mixing of the ingredients constituting the hardener component commences with the four hardeners, followed by the addition of the two fillers. Again, blending is achieved in a Cowles mixture, the resulting formulation is degassed as necessary, and is maintained in a heated and agitated condition. Just prior to casting, weighed quantities of the two components are admixed in a weight ratio of 2:1 of the resin component to the hardener component.

Utilizing a centrifugal casting machine capable of achieving rotation rates of about 500 revolutions per minute, and fitted with a 12 inch diameter silicone rubber mold having five cavities dimensioned and configured to produce the desired laps, casting of the foregoing compound is effected. Prior to initial startup, the mold parts are heated for approximately thirty minutes in an oven at a temperature of about 175° Centigrade, following which the sections are positioned between a pair of casting plates of an air locking table, and are maintained in mated position by compressed air force. Thereafter, the mold is caused to rotate at a speed of approximately 300 to 350 rpm, and the casting compound is introduced thereinto through a central opening formed in the upper mold section. Rotation of the mold is continued for a period of approximately three minutes, following which the machine is stopped and the mold is released from the locking members. The halves of the mold are separated, the gates and sprue are cut, and the cast parts are removed.

The laps so produced are permitted to achieve final curing on a flat surface under ambient conditions, preferably for a period of at least 24 hours, after which their crowns and lateral gripping surfaces are machined (as in the case of cast iron and aluminum laps), to true the axes and to achieve the ultimate curvature specified for the optometric grinding and finishing operations. It will be appreciated that generally the laps will be made with standard curvatures, from which finished tools having diopter values necessary to achieve the specified correction factors will be produced by machining. Nevertheless, it should also be understood that the silicone molds could be fabricated to produce the finished tool directly, thus obviating the need for further significant machining. The lap has a hardness value of about 90 to 93, when tested with a Barcol Model GYZJ 935 impresser (Barber-Colman) using ASTM method D 2583.

EXAMPLE TWO

A lens block, adapted to support the lens blank, is produced from a formulation including the following ingredients:

| Resin Component | Weight Percent |
| --- | --- |
| polyepoxide (Dow D.E.R. 332) | 30.0 |
| atomized aluminum (Alcoa 101) | 9.0 |
| milled carbon fiber (Hercules, Inc.) | 2.0 |
| calcium carbonate (Pfizer 325) | 57.5 |
| glycerine (Procter and Gamble) | 0.4 |
| fumed silica (CAB-O-SIL M5) | 0.1 |
| dry lubricant (DuPont VYDAX AR 20) | 1.0 |
| | 100.0 |
| Hardener Component | |
| isophorone diamine (Jefferson Chemical) | 20.0 |
| TETA | 10.0 |
| TEPA | 5.0 |
| TEDA | 5.0 |
| Atomized aluminum (Alcoa 101) | 15.0 |
| soy amide (AJICURE AB002) | 5.0 |
| calcium carbonate (Pfizer 325) | 40.0 |
| | 100.0 |

The foregoing ingredients are admixed in substantially the manner described in connection with Example One, introducing the individual ingredients of each of the two components in the order listed. Following completion of the preparation of the resin component and the hardener component, they are admixed together in a weight ratio of 3:1, respectively.

As in the foregoing Example, a mold fabricated from silicone rubber, having a multiplicity of cavities adapted to produce lens block tools (similar in configuration to that which is illustrated in Beasley U.S. Pat. No. 3,140,568) is mounted in the manner described in a centrifugal casting machine. The blended epoxy formulation, at a temperature of about 60° Centigrade, is introduced into the mold, and it is rotated for a period of approximately three minutes so as to distribute the resin formulation to the mold cavities and to provide a sufficient period of curing. Thereafter, the mold assembly is removed from the machine, separated into its constituent parts, and the lens blocks so produced are stripped from the mold.

After ageing for a period of about 24 hours on a flat surface, to achieve full cure, the resulting casting is machined to the curvature specified for the blank engaging face of the block. The tool exhibits a hardness value of about 90 to 93 when tested with a Barcol impresser, in the manner described. Moreover, the tools produced in accordance herewith may be case hardened by nitride treatment, they may be anodized, and they may be electroplated with chromium or the like, if so desired.

Upon close inspection of a cross section of the tools produced in accordance with both of the foregoing Examples, it is seen that the fillers included in the casting compound are uniformly dispersed therethroughout, with no perceptible variation in concentration. The tools exhibit a very high level of dimensional stability, and they show virtually no water absorption; they are very hard and durable, wear resistant, and may readily be machined to produce very precise working surfaces, and the gripping and chucking elements necessary for mounting in suitable surfacing equipment.

Thus, it can be seen that the present invention provides a novel, monolithic tool for use in surfacing of optical lenses, which is relatively inexpensive and light in weight. The tool is produced from an epoxy resin, and is uniformly hard, durable, dimensionally stable and machineable; it may also exhibit enhanced thermal and electrical conductivity. The invention also provides a novel method for producing such a tool, which method can be carried out quickly, conveniently and at relatively low cost. The hardener system used in the casting compound effects a reduced level of attack upon silicone rubber, thus enhancing the desirability of using mold cavities fabricated therefrom in the casting operations, and it does so while nevertheless affording excellent physical properties in the tool produced. Finally, the combinations of fillers homogeneously dispersed and in the amounts specified, permit highly precise machining, and permit the tool to accurately hold its shape and curve without warpage or distortion.

Having thus described the invention, what is claimed is:

1. A tool for use in surfacing of optical lenses produced by a method comprising the steps of:
   a. preparing a resin component including:
      (1) a reactive epoxy resin, and
      (2) a filler consisting of finely divided aluminum, a finely divided inert mineral, or a mixture thereof;
   b. preparing a hardener component including:
      (3) at least one hardener reactive with said epoxy resin to produce cross-linking, and
      (4) a filler consisting of finely divided aluminum, a finely divided inert mineral, or a mixture thereof;
   c. admixing said resin component and said hardener component in a ratio selected to provide, in the resulitng admixture, a suitable amount of said hardener to effect substantially complete reaction with said epoxy resin and a high degree of cross-linking, and to provide about 5 to 15 percent of said aluminum, and about 50 to 65 percent of said mineral, based upon the weight of said admixture;
   d. introducing said admixture into the casting system of a centrifugal casting machine having at least one casting cavity dimensioned and configured to produce said tool;
   e. operating said machine to effect centrifugal casting of said admixture into said casting cavity;
   f. maintaining said admixture at an appropriate temperature for a period of time sufficient to effect substantial cross-linking between said resin and said hardener so as to thereby produce said tool; and
   g. removing said tool from said casting cavity; said tool comprising a monolithic body having a generally spherical surface portion adapted to engage on optical lens member, and a mounting portion spaced from said spherical surface portion and having means thereon corresponding to features of said surface portion adapted to permit accurate registration of said surface portion elements with respect to the device in which said tool is to be mounted, said tool being uniformly hard, durable and dimensionally stable, and being adapted for machining to modify the dimensions and configurations of said portions thereof.

2. The tool of claim 1 wherein said epoxy resin is a product of reaction between bisphenol A and epichlorohydrin.

3. The tool of claim 1 wherein said hardener comprises a mixture of at least one aliphatic polyalkylene polyamine and at least one fatty acid amide.

4. The tool of claim 1 wherein said hardener includes triethylene tetramine and tetraethylene pentamine.

5. The tool of claim 3 wherein said hardener component additionally includes a diluent reactive with said epoxy resin to produce cross-linking.

6. The tool of claim 5 wherein said diluent is nonylphenol, and wherein said hardener includes triethylene tetramine, tetraethylene pentamine, and a soy amide.

7. The tool of claim 1 wherein said finely divided aluminum is atomized aluminum, and wherein said inert mineral filler is calcium carbonate.

8. The tool of claim 1 wherein said resin component additionally includes a suspension agent for said fillers.

9. The tool of claim 8 wherein said suspension agent is fumed silica.

10. The tool of claim 1 wherein said resin component is admixed with said hardener component in a weight ratio of about 1.5 to 3:1.

11. The tool of claim 10 wherein said ratio is about 2:1.

12. The tool of claim 1 wherein said casting machine has a plurality of said casting cavities.

13. The tool of claim 1 wherein said casting cavity is fabricated from a silicone rubber having a Shore A Durometer hardness value of about 40 to 70.

14. The tool of claim 1 wherein said admixture is introduced into said casting machine while said machine is in operation.

15. The tool of claim 1 wherein said casting cavity defining member is at a temperature of about 70° to 120° Centigrade when said admixture is cast thereinto, and wherein said period of time is at least about 1 to 3 minutes.

16. The tool of claim 15 wherein said member is preheated to achieve said temperature and to provide the thermal energy necessary to effect said cross-linking.

17. The tool of claim 13 wherein said hardener comprises a mixture of at least one aliphatic polyalkylene polyamine and at least one fatty acid amide.

18. The tool of claim 13 wherein said hardener includes triethylene tetramine and tetraethylene pentamine.

19. The tool of claim 18 wherein said hardener additionally includes nonylphenol and a soy amide.

20. The tool of claim 1 wherein said tool is a lap and wherein said generally spherical surface portion is of convex configuration and is adapted for grinding or polishing of the lens member, said features constituting the axes of curvature of said surface portion.

21. A tool for use in surfacing of optical lenses comprising a monolithic body cast from a highly filled epoxy casting compound, said body having a generally spherical surface portion adapted to engage an optical lens member, and a mounting portion spaced from said spherical surface portion and having means thereon corresponding to features of said surface portion adapted to permit accurate registration of said surface portion elements with respect to the device in which said tool is to be mounted, said epoxy casting compound comprising an epoxy matrix and a finely divided filler, said filler comprising a mixture of aluminum and an inert mineral and being uniformly distributed throughout said matrix in said tool said aluminum comprising about 5 to 15 weight percent of said compound, and said mineral comprising about 50 to 65 weight percent of said compound, said tool being hard, durable and dimensionally stable, and being adapted for machining to modify the dimensions and and configuration of said portions thereof.

22. The tool of claim 21 wherein said tool is a lap and wherein said generally spherical surface portion is of convex configuration and is adapted for grinding or polishing of the lens member, said features constituting the axes of curvature of said surface portion.

23. The tool of claim 20 wherein said matrix is produced by the reaction of a reactive epoxy resin and a hardener system including at least one amine hardener, said resin comprising about 20 to 30 weight percent of said compound, and said hardener comprising about 5 to 15 weight percent thereof.

24. The tool of claim 20 wherein said fillers additionally include an amount of graphite fiber, effective to provide enhanced thermal and electrical conductivity to said tool.

25. The tool of claim 21 wherein said casting compound additionally includes an amount of a suspension agent effective to maintain uniform dispersion of said fillers throughout said epoxy matrix.

26. The tool of claim 25 wherein said aluminum is atomized aluminum.

27. The tool of claim 21 wherein said tool has a hardness value of not less than about 60, as determined by a Barcol impresser utilizing ASTM Test Method D 2583.

* * * * *